(12) United States Patent
Gosselink et al.

(10) Patent No.: US 6,190,538 B1
(45) Date of Patent: Feb. 20, 2001

(54) PROCESS FOR THE PREPARATION OF A CATALYST COMPOSITION

(75) Inventors: Johan Willem Gosselink; Johannes Anthonius Robert Van Veen; Arend-Jan Van Welsenes, all of Amsterdam (NL)

(73) Assignee: Shell Oil Company, Houston, TX (US)

( * ) Notice: Under 35 U.S.C. 154(b), the term of this patent shall be extended for 0 days.

(21) Appl. No.: 09/365,011

(22) Filed: Aug. 2, 1999

(30) Foreign Application Priority Data

Aug. 3, 1998 (EP) .................................................. 98306162

(51) Int. Cl.$^7$ .................................................. C10G 47/00
(52) U.S. Cl. ........................ 208/111.01; 502/64; 502/67; 502/68; 502/69
(58) Field of Search .................. 208/111.01; 502/64, 502/67, 68, 79

(56) References Cited

U.S. PATENT DOCUMENTS

| | | | |
|---|---|---|---|
| 4,097,365 | 6/1978 | Ward | 208/111 |
| 4,239,655 | 12/1980 | Inoue et al. | 252/455 Z |
| 4,419,271 | 12/1983 | Ward | 502/65 |
| 5,374,349 | 12/1994 | Occelli | 208/111 |
| 5,853,566 | 12/1998 | Kraushaar-Czametzki et al. | 208/109 |

FOREIGN PATENT DOCUMENTS

| | | | |
|---|---|---|---|
| 0247678 | 5/1987 | (EP) | C10G/47/20 |
| 0247679 | 5/1987 | (EP) | B10J/29/08 |
| 0394948 | 10/1990 | (EP) | C01B/33/34 |
| 1398831 | 4/1973 | (GB) | B01J/11/00 |
| 61-171401 | * 8/1986 | (JP) . | |
| 62-294441 | * 12/1987 | (JP) . | |
| 4224109 | 8/1992 | (JP) | B01J/29/06 |
| WO 91/17829 | 11/1991 | (WO) | B01J/29/06 |
| WO 92/09366 | 6/1992 | (WO) | B01J/29/06 |
| WO 95-33562 | 12/1995 | (WO) | B01J/37/02 |
| WO 97/20016 | 6/1997 | (WO) | C10G/47/16 |

* cited by examiner

*Primary Examiner*—Tom Dunn

(57) ABSTRACT

The present invention provides a process for the preparation of a catalyst composition which comprises, as first cracking component, a zeolite beta, and a second cracking component selected from (i) crystalline molecular sieves having pores with diameters greater than 0.6 nm, (ii) clays, and (iii) amorphous cracking components, the process comprising the steps of:

(a) preparing a mixture comprising the first cracking component and a gelatin material, and mixing intimately,
(b) mulling with the second cracking component, and
(c) extruding the mixture of step (b) into catalyst extrudates, and calcining the extrudates.

19 Claims, No Drawings

PROCESS FOR THE PREPARATION OF A CATALYST COMPOSITION

The present invention relates to a process for the preparation of a catalyst composition.

BACKGROUND OF THE INVENTION

Of the many conversion processes known in the refining art, hydrocracking has assumed a greater importance over the years since it offers the refiner product flexibility combined with product quality.

There has been considerable effort devoted to the development of hydrocracking catalysts which combine high cracking activity with a low tendency to overcrack towards light products and, in particular, to the less valuable $C_1$–$C_3$ and $C_4$ gaseous by-products.

Kerosine or gas oil (middle distillates) are often the desired products of a hydrocracking process. However, hydrocracking catalysts with a high selectivity towards middle distillates tend to have a low cracking activity. Such catalysts are typically based on a single, active cracking component such as an aluminosilicate, especially a Y zeolite component.

It is known, e.g. from International (PCT) Patent Specifications Nos. WO 91/17829, WO 92/09366 and WO 97/20016, to form composites of two different cracking components, e.g. Y zeolite and zeolite beta aluminosilicates, for use in hydrocracking, or other hydro or chemical conversion processes. Such composite catalysts are commonly prepared by the conventional techniques of combining the active cracking component(s) with a binder or binder-forming material and then extruding the mixture, drying the extrudates so-formed and calcining. Specifically the combination of materials is carried out by co-mulling the ingredients together in mix-muller equipment, usually with water and a peptising agent.

SUMMARY OF THE INVENTION

It has now been found that by an improved preparation technique, composite catalysts can be obtained having an improved hydrocracking activity coupled with a good middle distillate selectivity and a significantly reduced level of undesirable gaseous ($C_1$–$C_3$ and $C_4$) by-products.

The present invention provides a process for the preparation of a catalyst composition which comprises, as first cracking component, a zeolite beta, and a second cracking component selected from (i) crystalline molecular sieves having pores with diameters greater than 0.6 nm, (ii) clays, and (iii) amorphous cracking components, the process comprising the steps of:

(a) preparing a mixture comprising the first cracking component and a gelatin material, and mixing intimately,
(b) mulling with the second cracking component, and
(c) extruding the mixture of step (b) into catalyst extrudates, and calcining the extrudates.

DETAILED DESCRIPTION OF THE INVENTION

The essential ingredient of the improved process of the invention is the use of a gelatin material prior to mulling with the second cracking component in the preparation of the composite catalyst.

Gelatin (also termed gelatine) itself is the preferred material to be used. However, equivalent organic or synthetic materials, which act in a similar manner are also encompassed by the present invention.

By the term "gelatin material" there is therefore to be understood a natural or synthetic polymer material which acts similarly to gelatin, a polymer which swells in the presence of water and becomes fully water-soluble at a temperature of above 35° C. Materials that can be expected to act similarly to gelatin include, for example, complex organic polymeric materials such as polypeptide derivatives, e.g. collagen, and polysaccharide derivatives, e.g. agar. Most commercial gelatins contain molecular species, being complex polypeptide molecules, having a molecular weight in the range of from 15,000 to 250,000, and are derived from animal (bovine or porcine) or fish skin.

Most grades of gelatin or equivalent may be used in the process of the invention, whether as a coarse grained or fine powder, or in a liquid formulated form, or in a natural or synthetic form. It is believed, however, that cross-linked forms would not be useful in the present invention.

The gelatin material may thus be used in the process of the invention in dry form or as a liquid formulation. In the latter, the gelatin material is conveniently used in an aqueous suspension or solution. Water conveniently is used as suspension base or as solvent. Other aqueous materials may be used, e.g. aqueous polyhydric alcohols, but are less preferred. If the gelatin material is used in dry form then a suitable aqueous medium should also be used in step (a) of the process. The preferred aqueous medium for use with the gelatin material is water. When used as a liquid formulation, preferably there is in the range of from 40:60 to 60:40, of gelatin material to aqueous medium, especially about 50:50 gelatin material to medium, on a weight basis. Particularly preferred gelatin material for use in the present invention is a liquid formulation of gelatin in water, especially one containing in the range of from 40 to 60% by weight of gelatin, such as that sold by the Sigma-Aldrich family of companies.

The amount of gelatin material used is not believed to be critical. The preferred aqueous formulation is suitably used in the present process in an amount in the range of from 0.1:1 to 1:1 g/g gelatin formulation to first cracking component; especially in a weight ratio of about 1:2 of aqueous gelatin formulation to first cracking component.

The gelatin material and first cracking component are intimately or vigorously mixed. Such mixing is preferably accomplished using ultrasound techniques, for example at a frequency in the range of 10 to 30 kHz and a power of 220 W for a time period of at least 30 minutes and/or of at most 2 hours; and very suitably for about 40 minutes to about 1 hour. However any method in which mixing at near to molecular level can be achieved is suitable. For example, any method which provides hydrodynamic cavitation, such as high speed, high shear stirring is also suitable. High speed, high shear stirring can be achieved, for example, by use of equipment such as the "ultra-turrax" equipment sold by Janke+Kunkel GmbH.

The further preparation of the composite catalyst of the invention is carried out in conventional manner to incorporate the remaining ingredients. Thus, step (b) of the present process may conveniently be carried out by mulling the mixture from step (a) and the second cracking component, optionally together with binder, in the presence of water and a peptising agent, e.g. acetic acid or nitric acid, to form a mixture which is subsequently extruded into catalyst extrudates in step (c) and then calcined.

Step (c) of the present process may be effected using any conventional, commercially available extruder. In particular, a screw-type extruding machine may be used to force the mixture through orifices in a die plate to yield catalyst extrudates of the required form, e.g. cylindrical or trilobed. The strands formed on extrusion may then be cut to the appropriate length. If desired, the catalyst extrudates may be dried, e.g. at a temperature of from 100 to 300° C. for a period of 30 minutes to 3 hours, prior to calcination in step (c).

Calcination is conveniently carried out in air at a temperature in the range of from 300 to 800° C. for a period of from 30 minutes to 4 hours. Preferably, the calcination is effected at a temperature in excess of 450° C., especially at a temperature in the range of from 500 to 600° C.

The first and second cracking components of the composite catalyst may be any of such components noted as suitable for such composite catalyst formulations.

Thus the first cracking component may be any catalytically active zeolite beta—a crystalline zeolite described in US Patent Specification No. Re 28,341 or known from the Atlas of Zeolite Structure Types, 3rd Edition, published in 1992 on behalf of the Structure Commission of the International Zeolite Association. Particularly good results have been given with small crystal size zeolite beta. Suitably, the zeolite beta has a silica to alumina molar ratio of at least 20, preferably at least 25. Zeolite beta with a higher silica to alumina molar ratio, e.g. up to, and including 60, 80, 100, 120 or 150, may also be used if desired. Thus, the zeolite beta may have a silica to alumina molar ratio in the range of from 20 to 60, 25 to 60, 20 to 80, 25 to 80, 20 to 100, 25 to 100, 20 to 120, 25 to 120, 20 to 150 or 25 to 150. The zeolite beta crystals are preferably less than 100 nm in size, e.g. up to 99 nm in size. More preferably, the crystals are in the range of from 20 to 95 nm in size, most preferably 70 nm or less, for example from 30, 40 or from 50 to 70 nm, in size.

Suitable zeolite beta materials are commonly available commercially, such as from the PQ Corporation.

It is most preferred, however, that zeolite beta (first cracking component) is used in the form of a sol (i.e. a suspension of zeolite beta crystals of colloidal size in a liquid) which may conveniently be prepared by the method of Camblor et al., "Progress in Zeolite and Microporous Materials", Vol. 105, pp. 341–348, Elsevier (1997).

In the present specification, unless otherwise indicated, the silica to alumina molar ratio of a zeolite is the molar ratio as determined on the basis of the total or overall amount of aluminium and silicon (framework and non-framework) present in the zeolite.

The second cracking component which is combined with the mixture of step (a) is selected from (i) crystalline molecular sieves having pores with diameters greater than 0.6 nm (e.g. as determined by nitrogen adsorption techniques), (ii) clays, and (iii) amorphous cracking components.

In the context of the present specification, the term "molecular sieve" also includes the corresponding (hydrothermally) stabilised and dealuminated derivatives and such derivatives as may be obtained by isomorphous substitution and cation exchange. Methods for the cation exchange, (hydrothermal) stabilisation, dealumination and isomorphous substitution of molecular sieves are well known in the art and are not therefore further discussed in the present specification.

The second cracking component may be a single material (i), (ii) or (iii), or a combination of two or more such materials.

Preferably, the second cracking component is selected from (i) crystalline molecular sieves of structure type FAU, EMT, MOR, LTL, MAZ, MTW, OFF, BOG, AET, AFI, AFO, AFR, AFS, AFY, ATS, VFI and CLO as described in the "Atlas of Zeolite Structure Types"; (ii) clays of the non-pillared smectite type, e.g. montmorillonites, hectorites, saponites and beiddelites, and (iii)) amorphous silica-alumina.

Most preferably, the second cracking component is (i) a crystalline molecular sieve of structure type FAU, e.g. an ultrastable zeolite Y (USY) or a very ultrastable zeolite Y (VUSY) of unit cell size ($a_o$) less than 2.440 nm (24.40 Ångstroms), in particular less than 2.435 nm (24.35 Ångstroms) as are known, for example, from European Patent Specifications Nos. 247 678 and 247 679.

Whilst USY and VUSY Y zeolites are the preferred form of second cracking component used in the present invention, other Y zeolite forms are also suitable for use, for example the known ultrahydrophobic Y zeolites.

The preferred VUSY zeolite of EP-A-247 678 or EP-A-247 679 is characterised by a unit cell size below 2.445 nm (24.45 Ångstroms) or 2.435 nm (24.35 Ångstroms), a water adsorption capacity (at 25° C. and a $p/p_o$ value of 0.2) of at least 8% w of the zeolite and a pore volume of at least 0.25 ml/g wherein between 10% and 60% of the total pore volume is made up of pores having a diameter of at least 8 nm.

Amorphous cracking components are well known in the art. Usually such components are a mix of silica and alumina which may be silica-rich (for example containing from above 50 to 95% by weight silica), alumina-rich, or of equal proportions of silica and alumina. Conventional homogeneous amorphous silica alumina materials can be used, as can the heterogeneous dispersions of finely divided silica alumina in an alumina matrix, as described in U.S. Pat. Nos. 4,097,365 and 4,419,271.

In addition to the first and second cracking components, a porous acidic or non-acidic binder, in particular a refractory inorganic oxide binder, may also be incorporated into the catalyst composition in the process of the invention where necessary e.g. to assist with extrusion. Examples of suitable binders include alumina, silica, aluminium phosphate, magnesia, titania, zirconia, silica-alumina, silica-zirconia, silica-boria and combinations thereof. Alumina is the most preferred binder. It is also possible to use a material which converts into a suitable binder material under the extrusion and calcining conditions of the process of the invention. Such suitable binder-forming materials include alumina hydrogels or silica-alumina co-gels. If present, the amorphous cracking component can also act as binder for the other cracking component s), where necessary.

The first and second cracking components and optional binder are combined in amounts such that the eventual calcined catalyst extrudates comprise preferably in the range of from 0.5 to 40% w zeolite beta (first cracking component), in the range of from 0.5 to 90% w second cracking component and in the range of from 0 to 99% w binder. Depending upon the cracking component used, the ratio of first to second cracking component may vary. For example, for a VUSY material as second cracking component a typical weight ratio of zeolite beta to VUSY is in the range of from 3:1 to 1:30, preferably from 1:2 to 1:10, and most preferably from 1:4 to 1:5. In such cases typically in the range of from 4 to 80% w of the catalyst can be zeolite (beta plus VUSY), and the remainder being binder, all percentages by weight (% w) being calculated on the basis of the combined dry weight of first cracking component, second cracking component, and binder.

The catalyst composition prepared by the process of the present invention will usually further comprise at least one hydrogenation component. Examples of hydrogenation components that may suitably be used include Group VI components (such as molybdenum and tungsten) and Group VIII components (such as cobalt, nickel, platinum and palladium). Preferably, at least two hydrogenation components are used, e.g. a molybdenum and/or tungsten component in combination with a cobalt and/or nickel component or platinum in combination with palladium. Particularly preferred combinations are nickel/tungsten, nickel/molybdenum, and platinum/palladium.

The at least one hydrogenation component may be incorporated at any stage during the preparation of the catalyst composition, according to techniques conventional in the art. For example, the at least one hydrogenation component may be loaded onto one or both of the cracking components by means of the known techniques of cation exchange or pore volume impregnation e.g. before the first cracking component is treated in step (a) of the present process, or before the second cracking component is used in step (b). Alternatively, the at least one hydrogenation component may be added during step (a), in step (b) and/or may be added to the extrudates of step (c), either before or after calcining, typically as one or more aqueous (impregnating) solutions of Group VI and/or Group VIII metal salts.

In a preferred aspect of the present invention, the at least one hydrogenation component is added subsequent to step (c) i.e. after calcining the extrudates. Thus, the present invention further provides a process for the preparation of a catalyst composition wherein after step (c) a further step (d) is taken, which comprises (d) adding the at least one hydrogenation component to the calcined extrudates. It is further preferred that the impregnated extrudates are then again calcined as hereinbefore described.

The catalyst composition may contain up to, and including 50 parts by weight of hydrogenation component, calculated as metal per 100 parts by weight of total, dry catalyst composition. For example, the catalyst composition may contain in the range of from 2 to 40, more preferably from 5 to 30 and especially from 10 to 30, parts by weight of Group VI metal(s) and/or in the range of from 0.05 to 10, more preferably from 0.5 to 8 and advantageously from 1 to 6, parts by weight of Group VIII metal(s), calculated as metal per 100 parts by weight of total, dry catalyst composition.

Such a catalyst composition containing a hydro-genation component may advantageously be used in a process for converting a hydrocarbonaceous feedstock into lower boiling materials which comprises contacting the feedstock with hydrogen at elevated temperature and elevated pressure in the presence of the catalyst composition (a hydrocracking process).

As is usual in the art, the oxide-form catalysts prepared by the process of the present invention may be converted to the sulphide form prior to use, either presulphided ex-situ or sulphided in-situ by treatment with sulphur, hydrogen sulphide or sulphur-containing feedstocks at elevated temperature, typically of the order of 140 to 370° C., and usually in the presence of hydrogen.

Hydrocarbonaceous feedstocks that may be converted by the above hydrocracking process include atmospheric gas oils, coker gas oils, vacuum gas oils, deasphalted oils, waxes obtained from a Fischer-Tropsch synthesis process, long and short residues, catalytically cracked cycle oils, thermally or catalytically cracked gas oils, and syncrudes, optionally originating from tar sand, shale oils, residue upgrading processes and biomass. Combinations of various hydrocarbon oils may also be used. The feedstock may comprise hydrocarbons having an initial boiling point of from at least 330° C. down to at least 50° C. The boiling range (from initial to final boiling point) may be in the range of from about 50 to 800° C., with preference being given to feedstocks having a boiling range of from about 60 to 700° C. The feedstock may have a nitrogen content of up to 10,000 ppmw (parts per million by weight) and a sulphur content of up to 6% w. Typically, nitrogen contents are in the range from 250 to 2000 ppmw and sulphur contents are in the range from 0.2 to 5% w. However, the feedstock may normally have a lower nitrogen and/or sulphur content; furthermore it is possible and may sometimes be desirable to subject part or all of the feedstock to a pre-treatment, for example, hydrodenitrogenation, hydrodesulphurisation or hydrodemetallisation, methods for which are known in the art, such that the feedstock subjected to hydrocracking has a much lower nitrogen, sulphur and/or metal content. A very suitable pre-treatment is carried out under conventional conditions using a catalyst such as that commercially available from Criterion Catalyst Company under the designation C-424.

The hydrocracking process may be carried out at a reaction temperature in the range of from 200 to 500° C., preferably in the range from 200 to 450° C.

The process is preferably carried out at a total pressure (at the reactor inlet) in the range from $3 \times 10^6$ to $3 \times 10^7$ Pa (30 to 300 bar), more preferably from $4 \times 10^6$ to $2.5 \times 10^7$ Pa (40 to 250 bar), e.g. from $8 \times 10^6$ to $2 \times 10^7$ Pa (80 to 200 bar).

The hydrogen partial pressure (at the reactor inlet) is preferably in the range from $3 \times 10^6$ to $2.9 \times 10^7$ Pa (30 to 290 bar), more preferably from $4 \times 10^6$ to $2.4 \times 10^7$ Pa (40 to 240 bar) and still more preferably from $8 \times 10^6$ to $1.9 \times 10^7$ Pa (80 to 190 bar).

A space velocity in the range from 0.1 to 10 kg feedstock per litre catalyst per hour (kg. $l^{-1}.h^{-1}$) is conveniently used. Preferably the space velocity is in the range of from 0.1 to 8, particularly from 0.2 to 5 kg. $l^{-1}.h^{-1}$.

The ratio of hydrogen gas to feedstock (total gas rate) used in the process will generally be in the range from 100 to 5000 Nl/kg, but is preferably in the range from 200 to 3000 Nl/kg.

The present invention will be further understood from the following illustrative examples in which the silica to alumina molar ratio of an aluminosilicate (zeolite) was determined on the basis of the total amount of aluminium and silicon (framework and non-framework) present in the zeolite and the unit cell size ($a_o$) of an aluminosilicate (zeolite) was determined according to standard test method ASTM D 3942-80. Furthermore, the boiling points and density of the hydrocarbonaceous feedstocks were determined according to standard test methods ASTM D 86 and D 1298 respectively.

EXAMPLES

Example 1

(i) Preparation of a zeolite beta sol

A zeolite beta sol was prepared by the method of Camblor et al., "Progress in Zeolite and Microporous Materials", Vol. 105, pp. 341–348, Elsevier (1997), as follows.

To an aqueous solution of tetraethylammonium hydroxide (TEAH) free of alkali metal ions (225 g, 40% w solution, ex-Alfa) was added aluminium metal (2.93 g) and the solution was heated at 50° C. for 5 hours to effect total dissolution of the aluminium metal. Once all the aluminium had dissolved the solution was added, with stirring, to a mixture made by dispersing 'Aerosil 200' (trade mark) amorphous silica (162.5 g, ex-Degussa) in an aqueous solution of tetraethylammonium hydroxide (311.9 g TEAH, ex-Alfa, in 407 g water), which resulted in the formation of a gel (Si/Al atomic ratio of 25). After stirring for 15 minutes, the gel was transferred to an autoclave operated at 140° C. and 300 rpm for 240 hours. The contents of the autoclave were then quenched with cold water and the solids separated by centrifugation. Washing of the solids with distilled water until the pH of the wash water was less than pH 9 gave the desired product, a zeolite beta sol (Si/Al atomic ratio of 14; silica to alumina molar ratio of 28). X-ray diffraction and Transmission Electron Microscopy analyses carried out on the dried sol confirmed it to be pure zeolite beta with an average crystal size of 70 nm (700 Ångstroms).

(ii) Preparation of a catalyst composition of the present invention a) A catalyst composition was prepared according to the process of the present invention by combining zeolite beta prepared as in (i) above (21.2 g, loss on ignition (LOI) of 52.8%) with gelatin (0.5 g gelatin per g of zeolite beta) and water (20 g) and mixed ultrasonically at a frequency of approximately 20 kHz and power of 200 W for 1 hour. The gelatin used was obtained from Fluka, one of the Sigma-Aldrich group of companies, as "gelatine solution from cold water fish skin" comprising 45% by weight gelatin in water, preserved with 0.15% w propyl p-hydroxybenzoate and 0.2% w methyl p-hydroxybenzoate.

The resulting mixture had an LOI of 53%. The mixture was then loaded into a mix-muller with alumina (54.3 g, LOI of 26.3%, ex-Criterion), a very ultrastable zeolite Y (VUSY) according to EP-A-247 678 and EP-A-247 679 (58.4 g, LOI of 14.4%, ex-Zeolyst) having a silica to alumina molar ratio of 9.9 and a unit cell size ($a_o$) of 2.431 nm (24.31 Ångstroms), water (53 g) and concentrated nitric acid (3 g), and the resulting mixture (LOI 53%) was mulled or kneaded for ½ hour and then extruded, together with an extrusion aid, into extrudates of cylindrical shape. The extrudates were then dried for 2 hours and calcined at 530° C. for 2 hours. The extrudates so obtained had a circular end surface diameter of 1.6 mm and a water pore volume of 0.66 ml/g, and comprised 10% w zeolite beta (first cracking component), 50% w VUSY zeolite (second cracking component) and 40% w alumina (binder), on a dry weight basis.

b) 19.8 g of nickel nitrate ($Ni(NO_3)_2 \cdot 6H_2O$) (14.1% w nickel) and 27.8 g of ammonium metatungstate were combined and the resulting mixture was diluted with water (46.8 g) and then homogenised. The extrudates (71 g) were impregnated with the homogenised mixture (46.8 ml), left to stand to age for 1 hour, dried at a temperature of 120° C. for 2 hours and then calcined for 2 hours at 535° C. The thus prepared catalyst composition contained 4% w nickel and 19% w tungsten (hydrogenation components), based on total composition.

Comparative Example A

Example 1 of International Patent Specification WO 97/20016 was repeated to produce a catalyst composition having 4% nickel and 19% w tungsten (based on total composition) on a support of 10% w zeolite beta, 50% w VUSY zeolite and 40% w alumina (based on dry weight of total support) prepared by co-mulling.

Example 2

The hydrocracking performance of the catalyst composition of Example 1 (hereinafter referred to as Catalyst 1) was assessed in a second stage series-flow simulation test. The testing was carried out in once-through microflow equipment which had been loaded with a top catalyst bed comprising 1 ml C-424 catalyst (commercially available from the Criterion Catalyst Company) diluted with 1 ml of 0.1 mm SiC particles and a bottom catalyst bed comprising 10 ml Catalyst 1 diluted with 10 ml of 0.1 mm SiC particles. Both catalyst beds were presulphided prior to testing.

The test involved the sequential contact of a hydrocarbonaceous feedstock (a heavy gas oil) with the top catalyst bed and then the bottom catalyst bed in a once-through operation under the following process conditions: a space velocity of 1.5 kg heavy gas oil per litre catalyst per hour (kg. $1^{-1}.h^{-1}$), a hydrogen gas/heavy gas oil ratio of 1450 Nl/kg, a hydrogen sulphide partial pressure of $4.7 \times 10^5$ Pa (4.7 bar) and a total pressure of $14 \times 10^6$ Pa (140 bar).

The heavy gas oil used had the following properties:

| | |
|---|---:|
| Carbon content: | 86.44 % w |
| Hydrogen content: | 13.49 % w |
| Nitrogen (N) content: | 9 ppmw |
| Added n-Decylamine: | 12.3 g/kg |
| | (equivalent to |
| | 1100 ppmw N) |
| Total nitrogen (N) content: | 1109 ppmw |
| Density (15/4° C.): | 0.8742 g/ml |
| Density (70/4° C.): | 0.8400 g/ml |
| Molar weight: | 433 g |
| Initial boiling point: | 351° C. |
| 50 % w boiling point: | 461° C. |
| Final boiling point: | 599° C. |
| Fraction boiling below 370° C.: | 4.6 % w |
| Fraction boiling above 540° C.: | 10.7 % w |

Hydrocracking performance was assessed at conversion levels between 40 and 85% w net conversion of feed components boiling above 370° C. The results obtained at 65% w net conversion of feed components boiling above 370° C. are shown in Table I below.

Comparative Example

The test procedure of Example 2 was repeated except that a bottom catalyst bed comprising 10 ml of the catalyst composition of Comparative Example A (hereinafter referred to as Catalyst A) diluted with 10 ml of 0.1 mm SiC particles was used. Hydrocracking performance was assessed at conversion levels between 40 and 85% w net conversion of feed components boiling above 370° C. The results obtained at 65% w net conversion of feed components boiling above 370° C. are also presented in Table I below.

TABLE I

| | Catalyst System | |
|---|---|---|
| | C-424/Cat. A | C-424/Cat. 1 |
| Temp. (° C.) at 65 % w net conversion | 373 | 370 |
| Product Selectivities (% w on feed) | | |
| Gas ($C_1$–$C_3$) | 1.2 | 0.9 |
| ($C_4$) | 3.8 | 3.3 |
| Naphtha ($C_5$ 150° C.) | 35 | 36 |

TABLE I-continued

| | Catalyst System | |
|---|---|---|
| | C-424/Cat. A | C-424/Cat. 1 |
| Kerosine (150–250° C.) | 35 | 36 |
| Gas Oil (250–370° C.) | 25 | 24 |
| Iso/Normal ratio of butanes | 2.5 | 2.7 |

It will be observed from Table I that Catalyst 1 (prepared by the process of the present invention) couples a maintained, good yield of middle distillates with a much reduced level of $C_1$–$C_3$ and $C_4$ gaseous by-products, and all at a lower temperature (370° C.) than Catalyst A (373° C.). Thus, Catalyst 1 demonstrates increased activity and reduced undesirable gaseous by-product without loss in middle distillate selectivity relative to Catalyst A.

Furthermore, the level of iso/normal isomerisation is improved for Catalyst 1 compared with Catalyst A. The higher the iso/normal ratio, the better the quality of the product. Whilst the iso/normal ratio for butanes only is quoted—which is higher for Catalyst 1 than Catalyst A—a similar outcome would be expected for the other products.

We claim:

1. A process for the preparation of a catalyst composition which comprises, as first cracking component, a zeolite beta, and a second cracking component selected from (i) crystalline molecular sieves having pores with diameters greater than 0.6 nm, (ii) clays, and (iii) amorphous cracking components, the process comprising the steps of:
   (a) preparing a mixture comprising the first cracking component and a gelatin material, and mixing intimately,
   (b) mulling with the second cracking component, and
   (c) extruding the mixture of step (b) into catalyst extrudates, and calcining the extrudates.

2. The process of claim 1 wherein the gelatin material is a formulation of gelatin in water.

3. The process of claim 2 wherein the ratio of gelatin formulation to first cracking component is in the range of from 0.1:1 to 1:1 g/g.

4. The process of claim 1 wherein the mixing of step (a) is performed using ultrasound or high speed, high shear stirring techniques.

5. The process of claim 3 wherein the mixing of step (a) is performed using ultrasound or high speed, high shear stirring techniques.

6. The process of claim 2 wherein the extrudates are calcined at a temperature of at least 450° C.

7. The process of claim 1 wherein the zeolite beta is a zeolite beta sol.

8. The process of claim 1 wherein at least one hydrogenation component is added to the extrudates of step (c) subsequent to calcining.

9. The process of claim 3 wherein at least one hydrogenation component is added to the extrudates of step (c) subsequent to calcining.

10. The process of claim 9 wherein the mixing of step (a) is performed using ultrasound or high speed, high shear stirring techniques.

11. The process of claim 1 wherein the second cracking component is selected from (i) a crystalline molecular sieve of structure type FAU;
   (ii) clays of the non-pillared smectite type;
   (iii) amorphous silica-alumina; or a combination of two or more thereof.

12. A composite catalyst composition prepared by the process of claim 1.

13. A composite catalyst composition prepared by the process of claim 3.

14. A composite catalyst composition prepared by the process of claim 8.

15. A composite catalyst composition prepared by the process of claim 9.

16. A process for converting a hydrocarbonaceous feedstock into lower boiling materials comprising the step of contacting the feedstock with the composite catalyst composition of claim 12.

17. A process for converting a hydrocarbonaceous feedstock into lower boiling materials, which comprises contacting the feedstock at elevated temperature in the presence of a composite catalyst composition of claim 13.

18. A hydrocracking process comprising the step of contacting a hydrocarbonaceous feedstock with a composite catalyst of claim 12 at an elevated temperature in the presence of hydrogen.

19. A process for converting a hydrocarbonaceous feedstock into lower boiling materials comprising the step of contacting the feedstock with the composite catalyst of claim 15.

* * * * *